United States Patent
Lammich

(10) Patent No.: US 11,827,177 B2
(45) Date of Patent: Nov. 28, 2023

(54) METHOD FOR CALIBRATING A POSITION DETECTION OF A PORTABLE KEY ELEMENT AND ACCESS CONTROL SYSTEM

(71) Applicant: U-Shin Deutschland Zugangssysteme GmbH, Erdweg (DE)

(72) Inventor: Marc-Tell Lammich, Erdweg (DE)

(73) Assignee: U-Shin Deutschland Zugangssysteme GmbH, Erdweg (DE)

( * ) Notice: Subject to any disclaimer, the term of this patent is extended or adjusted under 35 U.S.C. 154(b) by 162 days.

(21) Appl. No.: 17/128,292

(22) Filed: Dec. 21, 2020

(65) Prior Publication Data
US 2021/0188212 A1 Jun. 24, 2021

(51) Int. Cl.
*B60R 25/24* (2013.01)
*B60R 25/31* (2013.01)
*H04W 4/80* (2018.01)

(52) U.S. Cl.
CPC .......... *B60R 25/245* (2013.01); *B60R 25/246* (2013.01); *B60R 25/31* (2013.01); *H04W 4/80* (2018.02)

(58) Field of Classification Search
CPC ..... B60R 25/245; B60R 25/246; B60R 25/31; H04W 4/80; H04W 12/63; H04W 4/40; H04W 4/023; H04W 12/06; G07C 2209/63; G07C 9/00309; H04L 67/12
See application file for complete search history.

(56) References Cited

U.S. PATENT DOCUMENTS

| | | | |
|---|---|---|---|
| 5,929,769 A | 7/1999 | Garnault | |
| 6,198,996 B1 | 3/2001 | Berstis | |
| 8,335,599 B2 | 12/2012 | Dickerhoof et al. | |
| 9,775,100 B1 * | 9/2017 | Smereka | G01S 11/06 |
| 9,873,396 B2 | 1/2018 | Lem et al. | |

(Continued)

FOREIGN PATENT DOCUMENTS

| | | |
|---|---|---|
| CN | 1951026 B | 6/2010 |
| CN | 102419431 A | 4/2012 |

(Continued)

OTHER PUBLICATIONS

Partial English translation of CN 110239485; "Vehicle and vehicle-mounted entrance method" (Sep. 2019); (Year: 2019); pp. 1-13. (Year: 2019).*

(Continued)

*Primary Examiner* — Brian E Miller
(74) *Attorney, Agent, or Firm* — DLA PIPER LLP (US)

(57) ABSTRACT

A method is proposed for calibrating a position detection of a portable key element by an access control system for a motor vehicle. The access control system comprises a detection device which is configured to detect a position of the key element relative to the motor vehicle by means of radio. The method comprises generating a first trigger signal when the key element is located in a first position relative to the motor vehicle and detecting a first signal strength in response to the first trigger signal. The method determines a correlation of signal strength and distance of the key element relative to the motor vehicle depending on the first signal strength at the first position. Furthermore, an access control system for a motor vehicle is proposed.

17 Claims, 1 Drawing Sheet

(56) References Cited

U.S. PATENT DOCUMENTS

| | | | |
|---|---|---|---|
| 9,972,150 B2 | 5/2018 | Da Deppo et al. | |
| 10,101,433 B2* | 10/2018 | Laifenfeld | G01S 5/14 |
| 10,123,297 B1 | 11/2018 | Harney et al. | |
| 10,328,900 B1 | 6/2019 | Yakovenko et al. | |
| 10,415,528 B2 | 9/2019 | Chaplow et al. | |
| 2002/0084887 A1 | 7/2002 | Arshad et al. | |
| 2002/0118579 A1 | 8/2002 | Lucy et al. | |
| 2004/0021550 A1 | 2/2004 | Ohtaki et al. | |
| 2010/0075656 A1* | 3/2010 | Howarter | B60R 25/241 |
| | | | 340/5.2 |
| 2010/0305779 A1 | 12/2010 | Hassan et al. | |
| 2011/0316669 A1 | 12/2011 | McBride et al. | |
| 2013/0030645 A1 | 1/2013 | Divine et al. | |
| 2015/0070135 A1 | 3/2015 | Ford | |
| 2015/0102898 A1 | 4/2015 | Huennekens et al. | |
| 2015/0120151 A1 | 4/2015 | Akay et al. | |
| 2015/0149042 A1 | 5/2015 | Cooper et al. | |
| 2015/0363988 A1 | 12/2015 | Van Wiemeersch et al. | |
| 2016/0159321 A1 | 6/2016 | Lagabe | |
| 2016/0272154 A1 | 9/2016 | Sanji et al. | |
| 2016/0320469 A1* | 11/2016 | Laifenfeld | G01S 5/14 |
| 2017/0318612 A1 | 11/2017 | Gu et al. | |
| 2018/0002972 A1 | 1/2018 | Myers et al. | |
| 2018/0053416 A1 | 2/2018 | Sanji et al. | |
| 2018/0068510 A1 | 3/2018 | Atsumi | |
| 2019/0003439 A1* | 1/2019 | Chaplow | G07C 5/00 |
| 2019/0126843 A1 | 5/2019 | Bouchard et al. | |
| 2019/0130682 A1* | 5/2019 | Farges | B60R 25/245 |
| 2019/0248331 A1 | 8/2019 | Salah et al. | |
| 2019/0300006 A1 | 10/2019 | Golsch | |
| 2019/0304224 A1 | 10/2019 | Golsch | |
| 2019/0393618 A1* | 12/2019 | Guthrie | H01Q 3/36 |
| 2020/0169842 A1* | 5/2020 | Yamaguchi | H04W 4/023 |
| 2020/0196094 A1* | 6/2020 | Smith | H04W 4/029 |
| 2020/0196095 A1* | 6/2020 | Smith | H04W 64/003 |
| 2020/0297059 A1 | 9/2020 | Viner et al. | |
| 2020/0384952 A1* | 12/2020 | Lammich | B60R 25/245 |
| 2021/0046888 A1 | 2/2021 | Vardharajan | |
| 2021/0074093 A1* | 3/2021 | Love | G07C 9/00309 |
| 2021/0188212 A1* | 6/2021 | Lammich | B60R 25/31 |
| 2021/0270956 A1* | 9/2021 | Yoshida | G07C 9/00309 |

FOREIGN PATENT DOCUMENTS

| | | | | |
|---|---|---|---|---|
| CN | 102602363 | * | 7/2012 | B60R 25/24 |
| CN | 102611471 A | | 7/2012 | |
| CN | 102001424 B | | 12/2012 | |
| CN | 103946899 A | | 7/2014 | |
| CN | 103963742 A | | 8/2014 | |
| CN | 105093171 A | | 11/2015 | |
| CN | 107128282 | | 9/2017 | |
| CN | 107685711 A | | 2/2018 | |
| CN | 108307294 A | | 7/2018 | |
| CN | 109218972 A | | 1/2019 | |
| CN | 110239485 | * | 9/2019 | B60R 25/102 |
| CN | 107963059 B | | 3/2020 | |
| CN | 107454552 B | | 1/2021 | |
| CN | 109466506 B | | 6/2021 | |
| DE | 69913607 T2 | | 9/2004 | |
| DE | 102007002700 A1 | | 7/2008 | |
| DE | 102007010583 A1 | | 9/2008 | |
| DE | 10306610 C5 | | 12/2008 | |
| DE | 102010010057 A1 | | 9/2011 | |
| DE | 102011103406 | | 12/2012 | |
| DE | 102013112120 A1 | | 5/2015 | |
| DE | 102015106680 A1 | | 11/2015 | |
| DE | 102014010343 A1 | | 1/2016 | |
| DE | 102014115250 A1 | | 4/2016 | |
| DE | 102016108725 A1 | | 11/2016 | |
| DE | 102015214793 | | 2/2017 | |
| DE | 102016115754 A1 | | 3/2017 | |
| DE | 102017200257 | | 7/2017 | |
| DE | 102017105629 A1 | | 9/2017 | |
| DE | 102017213814 | | 2/2019 | |
| FR | 2934223 A3 | | 1/2010 | |
| GB | 2572584 | | 10/2019 | |
| JP | 2004183625 A | | 7/2004 | |
| JP | 2004232558 A | | 8/2004 | |
| JP | 2005139656 | | 6/2005 | |
| JP | 2006009650 A | | 1/2006 | |
| JP | 2006298169 | | 11/2006 | |
| JP | 2007063893 | | 3/2007 | |
| JP | 2007238025 | | 9/2007 | |
| JP | 2008285885 | | 11/2008 | |
| JP | 2008285946 A | | 11/2008 | |
| JP | 2009029376 A | | 2/2009 | |
| JP | 2009046837 A | | 3/2009 | |
| JP | 2009286343 A | | 12/2009 | |
| JP | 2010146095 A | | 7/2010 | |
| JP | 2010157794 A | | 7/2010 | |
| JP | 2011144624 A | | 7/2011 | |
| JP | 2011184918 A | | 9/2011 | |
| JP | 2012007971 A | | 1/2012 | |
| JP | 2012172367 A | | 9/2012 | |
| JP | 2015045183 A | | 3/2015 | |
| JP | 2015063827 A | | 4/2015 | |
| JP | 2015085899 A | | 5/2015 | |
| JP | 2015151792 A | | 8/2015 | |
| JP | 2005315024 A | | 11/2015 | |
| JP | 2015209715 A | | 11/2015 | |
| JP | 2016014259 A | | 1/2016 | |
| JP | 2016030919 A | | 3/2016 | |
| JP | 2016183489 A | | 10/2016 | |
| JP | 2016188499 A | | 11/2016 | |
| JP | 2018034635 A | | 3/2018 | |
| JP | 2018062808 | | 4/2018 | |
| JP | 2018141771 A | | 9/2018 | |
| JP | 2018145615 A | | 9/2018 | |
| JP | 2018178506 A | | 11/2018 | |
| JP | 2019032169 | * | 2/2019 | B60R 25/24 |
| KR | 20150011032 A | | 1/2015 | |
| WO | 2016/194997 | | 12/2016 | |
| WO | 2017/136725 | | 8/2017 | |
| WO | 2019048266 A1 | | 3/2019 | |
| WO | 2019097051 A1 | | 5/2019 | |

OTHER PUBLICATIONS

Partial English translation of CN 102602363; "Method and device for vehicle passive keyless entering, starting and locking based on ultra-wide band"; (Jul. 2012); ; pp. 1-20. (Year: 2012).*

* cited by examiner

METHOD FOR CALIBRATING A POSITION DETECTION OF A PORTABLE KEY ELEMENT AND ACCESS CONTROL SYSTEM

CROSS-REFERENCE TO RELATED APPLICATIONS

This application claims priority to German Application Serial No. 102019135665.2, filed Dec. 23, 2019, the content of which is incorporated herein by reference in its entirety.

TECHNICAL FIELD

The present disclosure relates to a method for calibrating a position detection of a portable key element. Furthermore, the present disclosure relates to an access control system for a motor vehicle.

BACKGROUND

For reasons of comfort, modern motor vehicles are increasingly equipped with automatically opening door systems. For this purpose, an owner receives a portable key element whose position can be detected by the vehicle. In response to certain detected positions, a door, for example, can be unlocked and/or opened automatically by the vehicle. A carrier of the key element therefore does not have to take it into his hand and/or operate it, for example by pressing a button, before access to the vehicle can be gained. This makes the access to the motor vehicle particularly convenient.

In US 2018/0234797, a calibration of a machine learning algorithm for keyless entry is described.

It may be intended for a motor vehicle that an access control is dependent on a position of a portable key element. The position of the key element is determined by radio. The position determination is usually based on a signal strength, which is correlated with a distance. However, due to manufacturing deviations and/or deviations in the respective electrical resistances, transmission power and/or reception quality may vary, which may result in inaccurate position detection. It may also be intended to couple different kinds of key elements for the first time with the access control system of the motor vehicle, which could not yet be taken into account in the production and configuration of the motor vehicle and the access control. In order to reduce these effects and to enable a precise position detection, a calibration can therefore be provided.

DESCRIPTION OF THE INVENTION

An object of the present invention is to increase the comfort of calibration of a position detection of portable key elements.

This task is solved by the subject matter of the independent patent claims which define the invention. Advantageous embodiments and expedient developments of the invention are indicated in the respective dependent claims.

A first aspect relates to a method for calibrating a position detection of a portable key element by an access control system for a motor vehicle. The access control system may comprise a detection device configured to detect a position of the key element relative to the motor vehicle by radio. The motor vehicle may comprise at least one access element automatically adjustable between a closed position and an open position, wherein, for example, the access element can be configured as a door. In the closed position, an access opening of the motor vehicle can be closed by the access element and/or the access element can be locked. In the open position, the access opening can be unblocked by the access element and/or the access element can be unlocked so that it can be opened. The adjustment can be automatic and/or self-acting without the user having to operate a switch. The adjustment can be, for example, a pivoting, especially of a door around a vertical pivot axis. Additional or alternatively, the adjustment can be an unlocking or locking of a lock. The adjustment of the respective access elements can, for example, be carried out by means of an actuator installed in the vehicle, which interacts with one or more access elements. For example, an electric motor can be provided per vehicle door, by means of which the associated vehicle door can be swiveled between its respective positions and/or unlocked. The detection device may, for example, comprise several antennas for transmitting and/or receiving radio signals. A distance of the key element to a respective antenna can be determined, for example, depending on a signal strength of a radio signal received at the key element and/or antenna of the detection device. For example, respective antennas of the detection device may be located on the vehicle. For example, a radio signal can be triangulated for position detection. A position relative to the vehicle can be a distance and an angle in a horizontal plane relative to a point in the vehicle.

In order to calibrate the position detection, at least one position of the key element should be known, preferably at least two different positions, and respective corresponding transmission powers should be determined. This makes it possible to correlate respective transmission powers with a distance, for example by a quadratic regression. A quadratic regression is useful because a received signal strength decreases with the squared distance.

The method may comprise a step of generating a first trigger signal when the key element is located in a first position relative to the vehicle. The trigger signal can be triggered automatically or manually, for example. A manual triggering can be achieved, for example, by pressing a button on the key element when its carrier is located in the first position. The first position can be predetermined for the carrier, for example at a distance of 3 m from the front of the driver's door. For this procedure, the key element can be manually moved to the first position as the predetermined position. This target can be displayed to the carrier, for example, on a screen of the key element after starting a calibration process. An automatic generation of the trigger signal can be achieved, for example, by a sensor device whose sensor data allow conclusions to be drawn about the position of the key element and thus its location. For example, a camera of the motor vehicle can detect the key element and/or its carrier and the position can be determined by image evaluation.

The method may comprise a step of detecting a first signal strength in response to the first trigger signal. For example, the detection device may be configured to measure the signal strength. For example, a unit for the signal strength may be mW. Preferably, the signal strength is detected for each antenna that detects a radio signal used for positioning.

The method may comprise a step of determining a correlation of signal strength and distance of the key element relative to the motor vehicle as a function of the first signal strength at the first position. The correlation allows to assign a distance of the key element relative to the vehicle or respective antennas for other signal strengths.

The trigger signal allows a partially automated calibration. In particular, the acquisition and/or measurement of signal strengths does not have to be laboriously performed manually. If applicable, the user does not have to pay attention to position the key element in the first position.

The signal strength may correspond to a strength of a radio signal between the key element and the detection device, measured at the receiver. The detection device is preferably located in the vehicle. The radio signal can be sent between the detection device and the key element.

For example, the key element may not be set up to interact with the access control system prior to its calibration. For example, an appropriate setup, which may include interfacing with the detection device, may initiate the appropriate calibration. Thus, an accurate position detection of new key elements and/or of key elements which differ in structure, setup and/or transmission power from key elements previously interacting with the access control system can be easily and conveniently enabled. The detection of a signal strength can be a measurement for which preferably a signal transmission is caused, in particular permanent and/or periodic. The first position may correspond to an area in an interior and/or a surrounding area of the motor vehicle. The surrounding area can, for example, be divided into sectors, each of which corresponds to a position.

In a further embodiment of the method, it is provided that the method will comprise a step of generating a second trigger signal when the key element is located in a second position relative to the motor vehicle. The method may comprise a step of detecting a second signal strength in response to the second trigger signal. The method may comprise a step of determining a correlation of signal strength and distance of the key element relative to the motor vehicle depending on the first signal strength at the first position and the second signal strength at the second position. Two signal strengths can significantly improve the accuracy of the correlation and thus the calibration. The second signal strength, like the first signal strength, can thereby be detected for all antennas. The second trigger signal can also be generated manually or automatically. The second position is preferably different from the first position. For example, the carrier of the key element can be instructed to be in front of the rear door on the passenger side at a frontal distance of 1 m when the second trigger signal is generated by pressing a button on the key element.

In a further embodiment of the method, it is provided that the key element and/or the detection device comprises at least a first antenna and a second antenna, wherein the signal strength is detected for each antenna and the correlation of signal strength and distance of the key element relative to the motor vehicle is provided depending on the detected signal strength of the respective antennas. Thus, this may, in particular, improve the accuracy of a triangulation. For example, the detection device may comprise at least three antennas for transmitting and/or receiving respective radio signals for the triangulation, for each of which a corresponding signal strength is detected.

Preferably, the positions of the respective antennas in the motor vehicle are known so that they can be taken into account when determining the correlation of distance and signal strength.

In a further embodiment of the method, it is provided that the correlation of signal strength and distance of the key element relative to the motor vehicle is also determined depending on a radio shielding of the first and/or the second position, for example caused by a vehicle body and respective arrangement of the antennas in the motor vehicle. The radio shielding can be, for example, a reduction of a received transmission power, which is not caused by its distance to the transmitter and the transmission power used therefore. The radio shielding can be taken into account respectively for each antenna. A strength of the radio shielding can be determined as part of the method, for example with a simulation or an experiment. In a simulation, for example, respective CAD data of the motor vehicle can be used, wherein these can also comprise respective material data. The radio shielding can be determined and/or considered specifically for respective radio frequencies.

In a further embodiment of the method, it is provided that the determined correlation is stored in a database device. The correlation can be retrieved during the position detection of the key element for the access control, for example by the detection device. The correlation can thus be made available to other access control systems, for example if a similar kind of key element is to be coupled with the access control of a similar kind of motor vehicle. In this case, further calibration may not be necessary. The database device can be configured locally, for example as part of the key element or the motor vehicle. The database device can also be centralized, e.g. as a server, which can receive and/or send respective correlation data via a mobile network and/or the Internet. Respective correlations can be stored and assigned to an individual key element and/or to a key type. For example, respective correlations of the same key element can also be used when it is coupled with an access control system of another motor vehicle. The database device can also store and/or retrieve respective radio shieldings.

In a further embodiment of the method, it is provided to use Bluetooth low energy (BLE) as a radio standard. The BLE standard allows a particularly accurate positioning with low power consumption. In particular, BLE is often already implemented on smartphones, so that a corresponding smartphone can easily be used as a key element. Calibration can easily compensate for the different transmission power and/or the different design of different smartphones, which ultimately may influence the received signal strength during position determination and thus its accuracy.

In a further embodiment of the method, it is provided that the respective trigger signal is automatically generated when the key element is located in the first and/or second position. An automatic generation does not require an actuation by a user and is therefore particularly convenient. The method can thus also be carried out fully automatically and unnoticed by the carrier of the key element. Also, an automatic intermittent recalibration, for example to compensate for degradation of transmission power and/or reception quality due to aging of components, can be enabled by an automatically generated trigger signal.

In a further embodiment of the method, it is provided that a sensor device detects the position of the key element and/or a position of a carrier of the key element relative to the motor vehicle and the respective trigger signal is generated depending on the detected position of the key element and/or the position of the carrier. The position of the carrier can correspond at least indirectly to a position of the key element, so that the position of the carrier can be used as a proxy for the calibration. The position of the carrier can indirectly allow a localization of the key element. The sensor device may comprise respective sensors for the detection, such as, for example, a door position sensor or a 3D camera.

In a further embodiment of the method, it is provided that the respective trigger signal is automatically generated by manually opening an access element of the motor vehicle, by starting an engine, by sitting on a vehicle seat and/or by a sensor for detecting in an area surrounding the motor vehicle, in particular a camera or an ultrasonic sensor. A manual opening of an access element of the motor vehicle can serve as a detection that the carrier of the key element and thus also the key element itself is located in front of the access element. Accordingly, the position of the key element can be inferred from this. Usually, sensors for monitoring access element positions are already available in motor vehicles, so that the automatic generation of the trigger signal is possible at low cost. For example, it is often already monitored whether a door of the vehicle is open or closed. Likewise, seat occupancy sensors are often already provided for seat belt warning devices. Since the carrier of the key element usually carries it in a trouser pocket, the position of the key element can also be inferred indirectly from this. Starting the engine also implies that the wearer of the key element is behind the wheel. Preferably, the vehicle is designed to allow the engine to be started without inserting the key element into an ignition lock. The sensor for detecting an area surrounding the vehicle can also be a sensor of a driver assistance system, such as a brake assistant, and/or be used for autonomous driving. The sensor device may preferably be designed to detect a person in the surrounding area, who may be the carrier of the key element. The sensor for detecting the surrounding area can be a lidar sensor or 3D camera. By means of the detection of the surrounding area, the position of the carrier of the key element can preferably be detected directly. For example, a driver assistance system often needs to determine a distance from objects for its operation, so its respective sensors may already be designed for the corresponding detection.

Preferably, the method is designed to verify the position of the carrier of the key element and/or the key element detected by the sensor device, in particular by means of a detection by the detection device and/or sensor data of the sensor device. For example, the position can be detected multiple times and the correlation can be determined depending on the multiple positions. For example, an average value of the positions can be used and/or respective extreme values can be ignored. The method may also be applied iteratively and/or acquired signal strengths can be stored. For example, when sitting in the driver's seat, the carrier may not always have the key element in his or her trouser pocket but may also place it in a center console or on the passenger seat. If the corresponding signal strength were to be used only once, an inaccurate calibration could result. For example, with ten or more detections, such exceptions may have less effect on the calibration and therefore it may be sufficiently accurate.

Alternatively or additionally, the verification can, for example, be performed by detecting at least one position of the key element relative to the vehicle by radio, wherein no correlation is used for this position detection. The detection can be performed, for example, by means of the detection device. It is therefore an uncalibrated position detection by means of the detection device. This can be sufficiently accurate to determine, for example, whether the access element was opened by the carrier of the key element or by another person, such as a passenger or other companion.

Alternatively or additionally, the verification can, for example, be carried out on the basis of a detection of whether more than one person is in or has entered the vehicle. For example, two seat occupancy sensors can indicate an occupancy, so that it can be assumed that two persons have also entered the vehicle. In this case, for example, the correlation can be discarded in order to avoid unreliable indirect conclusions about the position of the key element by the sensor device.

Alternatively or additionally, the verification can, for example, be carried out by means of a face recognition, in particular in respective surrounding data, which were recorded by the sensor device. For example, a 3D camera can record at least one image of the surroundings. Respective faces can be recognized with an image evaluation algorithm and compared with stored faces in a database. For example, the database may store respective faces of authorized users of the vehicle. If a person can be identified, it can be assumed, for example, that this person is the carrier of the key element. The position of this person can then be used as a basis for the calibration method. In this way, calibration can also be performed reliably if several people have been detected in the vicinity of the motor vehicle.

In a further embodiment of the method, it is provided that the trigger signal is manually generated when the key element is located in the first and/or second position by actuating a trigger on the key element, such as, for example, a button. This enables a particularly precise calibration. Optionally, the calibration process itself can be started by actuating the trigger. Any required positions can be displayed by an output device.

In a further embodiment of the method, it is provided that the method is designed for calibrating a position detection of at least a first and a second portable key element by an access control system for a motor vehicle, wherein for each key element an associated correlation of signal strength and distance of the key element relative to the motor vehicle is determined. For this purpose, for each key element, an associated respective signal strength detection can be performed at respective positions. In particular, several different types of key elements can thus be calibrated. Once one of the two key elements has been calibrated, it can also be used to calibrate the other key element. For example, a key that is delivered with the motor vehicle can be calibrated and with its position data a subsequently coupled smartphone. However, the key supplied can also be calibrated at the factory. In both cases, its recorded position can be used to verify the position of the other key element.

A second aspect relates to an access control system for a motor vehicle. The access control system may comprise at least one portable key element. The access control system may comprise a detection device configured to detect at least one position of the key element relative to the motor vehicle by radio. The access control system may be configured to calibrate the position detection of the portable key element. The access control system may comprise a triggering device for generating a first trigger signal when the key element is located in a first position relative to the motor vehicle. The detection device may be configured to detect a first signal strength in response to the first trigger signal and the access control system may comprise a correlation device for determining a correlation of signal strength and distance of the key element relative to the motor vehicle depending on the first signal strength at the first position. In addition, the access control system may comprise an adjustment device for automatically adjusting at least one access element of the motor vehicle, such as, for example, a door, between its respective open position and respective closed position depending on the detected position of the key element relative to the motor vehicle.

The access control system may be configured to execute the method according to the first aspect.

Advantageously, the detection device may comprise one or more transmitters and the key element may comprise respective corresponding receivers. Alternatively or additionally the detection device may comprise one or more receivers and the key element may comprise respective corresponding transmitters. If the transmitter is provided to the detection device or respectively to the motor vehicle, the key element can be particularly simple and inexpensive. If the transmitter is provided to the key element, the motor vehicle or respectively the detection device can be inexpensive, especially when using the smartphone and/or the smartwatch as a key element. If both transmitters and receivers are provided to the detection device or respectively to the motor vehicle, the system can work flexibly with a wide variety of key elements. If transmitters and receivers are provided to the key element and to the detection device or respectively the motor vehicle, data can be exchanged, for example for authentication and/or unique identification of the respective key element. The multiple transmitters or receivers allow easy triangulation for position determination. In the present disclosure, "correspondingly" can mean in the present context in particular that the respective transmitters and receivers are configured to use the same radio frequency and/or the same radio standard. For example, a receiver can be designed to detect the radio signals of several transmitters, even simultaneously. The individual signal strength of each received signal can also be detected.

In a further advantageous embodiment of the access control system, it may be provided that the triggering device comprises a sensor device which is configured to automatically generate the trigger signal when the key element and/or a carrier of the key element is located in a first position relative to the motor vehicle. In particular, the sensor device may be configured to detect manual opening of a door handle, a person in a seat and/or a person in a surrounding area of the motor vehicle and to generate the trigger signal depending on this detection.

In a further advantageous embodiment of the access control system, the sensor device may comprise a seat occupancy sensor, a door opening sensor, an engine start sensor and/or a sensor of a driver assistance system and/or autonomous driving system, such as a camera, radar, lidar or ultrasonic sensor. These types of sensors help draw conclusions about the position of the key element and thus automatically generate the first trigger signal.

In a further advantageous embodiment of the access control system, it can be provided that the key element is configured as a radio key, smartphone, smartwatch, key card, RFID chip and/or remote control. In particular, a smartphone and a smartwatch are advantageous as a key element, as most people already own and carry such a device permanently with them. Thus, an additional device is not necessary. Moreover, such devices often already have the necessary radio technology to determine the position by means of the detection device. Furthermore, such devices often already have the computing power to implement parts of the access control system on them. Thus, no separate computing power needs to be provided, which makes the access control system particularly inexpensive. However, there is such a wide variety of different smartphones and smart watches that a factory calibration of the position detection in advance can be extremely costly and the position detection without calibration can be inaccurate. The access control system allows easy and convenient calibration, so this can be compensated for. In particular, calibration can also be used to precisely detect the positions of devices whose transmission power and/or reception quality of signals is unknown.

Further features of the invention result from the claims, the respective exemplary embodiments and from the drawings. The features and combinations of features mentioned above in the description as well as the features and combinations of features mentioned subsequently in the respective exemplary embodiments can be used not only in the respective combinations indicated in each case, but also in other combinations without leaving the scope of the invention.

The features and advantages resulting from the respective aspects also represent respective features and advantages of other aspects.

SHORT DESCRIPTION OF THE FIGURES

DETAILED DESCRIPTION OF EMBODIMENTS

Figure 1:
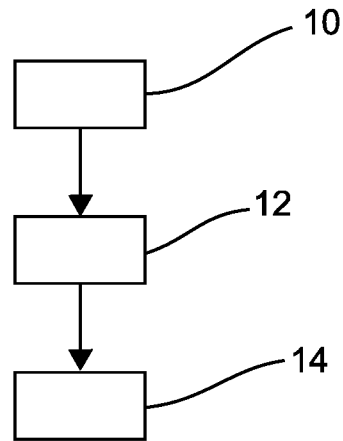
FIG. 1 illustrates, in a flowchart, a method for calibrating a position detection of a portable key element by an access control system for a motor vehicle, according to some embodiments of the present disclosure.
Figure 2:
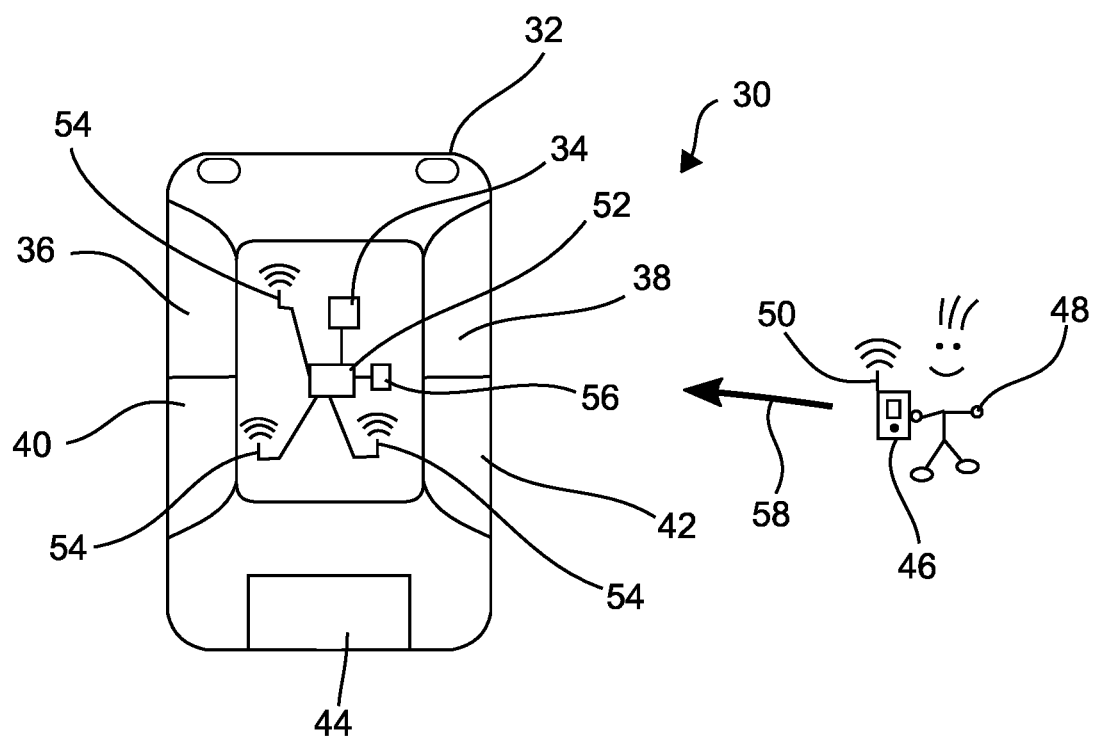
FIG. 2 shows, in a schematic view, an access control system for a motor vehicle, according to some embodiments of the present disclosure.

FIG. 1 illustrates in a flowchart a method for calibrating a position detection of a portable key element 46. The method is executed by an access control system 30 for a motor vehicle 32, which is shown in FIG. 2. The access control system 30 comprises a detection device 52, which is configured to detect a position of the key element 46 relative to the motor vehicle 32 by means of radio.

The key element 46 is here configured as a smartphone and is carried by a person 48. The motor vehicle 32 comprises several access elements 36, 38, 40, 42, configured as doors, as well as an access element 44 configured as a trunk lid. These access elements 36, 38, 40, 42, 44 are operatively connected to an adjustment device 34 of the access control system 30. With the adjustment device 34 the respective access elements can be adjusted between an open and a closed position depending on a detected position of the key element 46. For example, the person 48 with the key element 46 can approach the passenger door 38, as illustrated by arrow 58. The access control system can then automatically open the passenger door 38 in response to the corresponding positions detected.

For the position detection, the detection device 52 can, for example, be configured to triangulate a radio signal from the key element 46. The key element 46, for example, comprises an antenna 50 which generates a radio signal with a predetermined transmission power. This signal is received by three spaced-apart, arranged antennas 54 of the detection device 52. The detection device 52 is configured to determine the associated signal strength of the received signal for each antenna 54. With a known transmission power, the position of the key element 46 can then be determined on the basis of the different signal strengths at the antennas 54 and their known arrangement in the motor vehicle 32.

However, the transmission power of the key element 46 may be unknown and/or vary over its lifetime, for example due to aging. Alternatively or additionally, the reception quality at the antennas 54 may vary, for example due to aging. Similarly, the reception quality of the antennas 54 may be unknown, for example due to manufacturing deviations. The reception quality can influence the detected signal strength. Overall, this can influence the accuracy of position detection by radio. In order to improve the accuracy, the access control system is configured to execute the method for calibrating the position detection according to FIG. 1.

In a first step 10, the method provides for the generation of a first trigger signal when the key element 46 is located in a first position relative to the motor vehicle 32. Preferably, the location of the key element in the first position is inferred on the basis of respective sensor data of a sensor device 56 of the access control system 30. The sensor device 56 may, for example, comprise a door sensor which is configured to detect an opening of an associated access element 36, 38, 40, 42 and/or an actuation of a door handle of these access elements 36, 48, 40, 42. Thus it can be concluded that the person 48 and therefore also the key element 46 is situated in front of this access element 36, 38, 40 or 42 and thus the key element 46 is located there. Alternatively or additionally, the sensor device 56 may, for example, comprise sensors of a driver assistance system with which the person 48 and/or the key element 46 and their position relative to the motor vehicle can be detected directly. Such a sensor could be a 3D camera, for example. The sensor device 56 can thus be configured as a triggering device which automatically generates the trigger signal when the key element 46 is located in the first position.

The first trigger signal may thereby contain the position of the key element 46 determined in this way. Alternatively, the trigger signal can only be generated if the key element 46 is located in a predetermined first position, such as, for example, in front of a predetermined one of the respective access elements 36, 48, 40, 42.

In a second step 12, the method provides for the detection of a first signal strength in response to the first trigger signal. For example, for each antenna 54, the detection device 52 can measure and store an associated received first signal strength at the time of the trigger signal.

Thus, the signal strength at a certain distance is known. In step 14, the method involves determining a correlation of signal strength and distance of the key element 46 relative to the motor vehicle 32 depending on the first signal strength at the first position. This correlation is the result of the calibration and can be used in the determination of future positions of the key element 46 relative to the motor vehicle 32 by the access control system 30, for example for an automatic access control depending on the determined position of the key element 46. The detection device 52 can be configured to determine the correlation and thus be or function as a correlation device.

The invention claimed is:

1. A method for calibrating a position detection of a portable key element by an access control system for a motor vehicle, wherein the access control system comprises a detection device configured to detect a position of the key element relative to the motor vehicle by radio, comprising the steps:
generating a first trigger signal when the key element is located in a first position relative to the motor vehicle, wherein the first trigger signal is automatically generated when the key element is located in the first position, wherein the respective trigger signal is automatically generated by at least one of manually opening an access element of the motor vehicle, starting an engine, sitting on a vehicle seat, or a sensor for detecting a surrounding area of the motor vehicle;
detecting a first signal strength in response to the first trigger signal; and
determining a first correlation of signal strength and distance of the key element relative to the motor vehicle depending on the first signal strength at the first position.

2. The method according to claim 1, wherein Bluetooth low energy (BLE) is used as a radio standard.

3. The method according to claim 1, further comprising calibrating a position detection of at least a first and a second portable key element by the access control system for a motor vehicle, wherein for each key element an associated correlation of signal strength and distance of the key element relative to the motor vehicle is determined.

4. The method according to claim 1 further comprising the steps:
generating a second trigger signal when the key element is located in a second position relative to the motor vehicle;
detecting a second signal strength in response to the second trigger signal; and
determining a second correlation of signal strength and distance of the key element relative to the motor vehicle depending on the first signal strength at the first position and the second signal strength at the second position.

5. The method according to claim 4, wherein at least one of the key element or the detection device comprises at least a first antenna and a second antenna, wherein signal strengths are detected for each antenna and the first and second correlations of signal strength and distance of the key element relative to the motor vehicle is provided based on the detected signal strength of the respective antennas.

6. The method according to claim 5, wherein the first and second correlations of signal strength and distance of the key element relative to the motor vehicle are determined also based on a radio shielding of at least one of the first or second position.

7. The method according to claim 6, wherein the shielding comprises a vehicle body and respective arrangement of the first and second antennas in the motor vehicle.

8. The method according to claim 4, wherein at least one of the first and second determined correlation is stored in a database device.

9. The method according to claim 4, wherein the second trigger signal is automatically generated when the key element is located in the second position.

10. The method according to claim 9, wherein a sensor device detects at least one of the position of the key element or a position of a carrier of the key element relative to the motor vehicle and the second trigger signal is generated depending on the at least one of the detected position of the key element or the position of the carrier.

11. The method according to claim 9, wherein the second trigger signal is automatically generated by at least one of manually opening an access element of the motor vehicle, starting an engine, sitting on a vehicle seat, or a sensor for detecting a surrounding area of the motor vehicle.

12. The method according to claim 11, wherein the sensor for detecting a surrounding area of the motor vehicle comprises at least one of a camera or an ultrasonic sensor.

13. The method according to claim 4, wherein the second trigger signal is manually generated when the key element is located in the second position by actuating a trigger on the key element.

14. The method according to claim 13, wherein the trigger comprises a button.

15. An access control system for a motor vehicle, comprising:

at least one portable key element;

a detection device configured to detect at least one position of the key element relative to the motor vehicle by radio, wherein the access control system is configured to calibrate the position detection of the portable key element;

a triggering device for generating a first trigger signal when the key element is located in a first position relative to the motor vehicle, wherein the detection device is configured to detect a first signal strength in response to the first trigger signal, wherein the triggering device comprises a sensor device configured to automatically generate the first trigger signal when at least one of the key element or a carrier of the key element is located in the first position relative to the motor vehicle, wherein the sensor device comprises at least one of a seat occupancy sensor, a door opening sensor, an engine start sensor, a sensor of a driver assistance system, or a sensor of an autonomous driving system; and a correlation device for determining a correlation of signal strength and distance of the key element relative to the motor vehicle based on the first signal strength at the first position.

16. The access control system according to claim 15, wherein the sensor comprises at least one of a camera, radar, lidar or ultrasonic sensor.

17. The access control system according to claim 15, wherein the key element is configured as at least one of a radio key, a smartphone, a smartwatch, a key card, an RFID chip, or a remote control.

* * * * *